(12) United States Patent
Hamid (10) Patent No.: US 9,098,685 B2
(45) Date of Patent: Aug. 4, 2015

(54) FLEXIBLE METHOD OF USER AUTHENTICATION

(75) Inventor: Laurence Hamid, Ottawa (CA)

(73) Assignee: Activcard Ireland Limited, Dublin (IE)

( * ) Notice: Subject to any disclaimer, the term of this patent is extended or adjusted under 35 U.S.C. 154(b) by 1104 days.

(21) Appl. No.: 10/847,884

(22) Filed: May 19, 2004

(65) Prior Publication Data

US 2004/0215980 A1   Oct. 28, 2004

Related U.S. Application Data

(63) Continuation-in-part of application No. 09/625,548, filed on Jul. 25, 2000, now Pat. No. 7,137,008.

(51) Int. Cl.
*G06F 21/31* (2013.01)
*G06F 21/62* (2013.01)

(52) U.S. Cl.
CPC ............ *G06F 21/31* (2013.01); *G06F 21/6218* (2013.01)

(58) Field of Classification Search
CPC .................................. G06F 21/00; G06F 21/31
USPC ...................................... 726/2, 1, 26
See application file for complete search history.

(56) References Cited

U.S. PATENT DOCUMENTS

| | | | |
|---|---|---|---|
| 4,353,056 A | 10/1982 | Tsikos | |
| 4,596,898 A | 6/1986 | Pemmaraju | |
| 5,109,427 A | 4/1992 | Yang | |
| 5,187,482 A | 2/1993 | Tiemann et al. | |
| 5,187,748 A | 2/1993 | Lee | |
| 5,229,764 A * | 7/1993 | Matchett et al. | 340/5.52 |
| 5,233,404 A | 8/1993 | Lougheed et al. | |
| 5,677,953 A | 10/1997 | Dolphin | |
| 5,734,718 A | 3/1998 | Prafullchandra | |
| 5,818,936 A | 10/1998 | Mashayekhi | |
| 5,841,970 A * | 11/1998 | Tabuki | 726/2 |
| 5,877,483 A | 3/1999 | Bilich et al. | |
| 5,970,143 A | 10/1999 | Schneier et al. | |
| 5,978,919 A | 11/1999 | Doi et al. | |
| 5,995,630 A | 11/1999 | Borza | |
| 6,002,748 A * | 12/1999 | Leichner | 379/48 |

(Continued)

FOREIGN PATENT DOCUMENTS

EP   1 050 790 A2   11/2000
EP   1 085 424 A1    3/2001

(Continued)

OTHER PUBLICATIONS

Xiao Qinghan and Bian Zhaoqi, "An approach to Fingerprint Identification by Using the Attributes of Feature Lines of Fingerprint" IEEE Pattern Recognition, pp. 663, 1986.

(Continued)

*Primary Examiner* — Dant Shaifer Harriman (57) ABSTRACT

A method of authorizing a user at a location is disclosed. A user data input device is used for receiving of user information. In dependence upon stored policy data, a location of the workstation and other characteristics thereof, an authorization method for the user is determined. In the authorization method, the user is first identified with the security server and then optionally authorized thereby. The stored policy data results in different determined methods for different authorization procedures based upon the user data and the characteristic of the user data input device and the workstation.

23 Claims, 4 Drawing Sheets

(56) References Cited

U.S. PATENT DOCUMENTS

| | | | |
|---|---|---|---|
| 6,016,476 A | | 1/2000 | Maes et al. |
| 6,044,465 A | * | 3/2000 | Dutcher et al. .................. 726/13 |
| 6,074,434 A | | 6/2000 | Cole et al. |
| 6,088,805 A | * | 7/2000 | Davis et al. ...................... 726/10 |
| 6,160,903 A | | 12/2000 | Hamid et al. |
| 6,167,517 A | | 12/2000 | Gilchrist et al. |
| 6,193,153 B1 | | 2/2001 | Lambert ........................ 235/380 |
| 6,202,158 B1 | * | 3/2001 | Urano et al. ..................... 726/22 |
| 6,256,737 B1 | * | 7/2001 | Bianco et al. .................. 713/186 |
| 6,275,825 B1 | | 8/2001 | Kobayashi et al. |
| 6,308,273 B1 | * | 10/2001 | Goertzel et al. ................... 726/9 |
| 6,389,542 B1 | | 5/2002 | Flyntz .............................. 726/17 |
| 6,580,356 B1 | | 6/2003 | Alt et al. ......................... 340/5.8 |
| 6,609,198 B1 | | 8/2003 | Wood et al. |
| 6,618,806 B1 | | 9/2003 | Brown et al. |
| 6,691,232 B1 | | 2/2004 | Wood et al. |
| 6,711,681 B1 | | 3/2004 | Al-Salqan et al. |
| 6,910,131 B1 | | 6/2005 | Yamada et al. |
| 6,961,849 B1 | | 11/2005 | Davis et al. |
| 6,990,588 B1 | | 1/2006 | Yasukura |
| 7,137,008 B1 | | 11/2006 | Hamid et al. |
| 7,191,466 B1 | | 3/2007 | Hamid et al. |
| 8,296,570 B2 | | 10/2012 | Hamid et al. |
| 8,775,819 B2 | | 7/2014 | Hamid et al. |
| 2002/0016774 A1 | | 2/2002 | Pendlebury |
| 2003/0097593 A1 | | 5/2003 | Sawa et al. ..................... 713/201 |

FOREIGN PATENT DOCUMENTS

| | | |
|---|---|---|
| EP | 1176489 | 1/2002 |
| EP | 1 326 156 A2 | 7/2003 |
| EP | 1603003 | 12/2005 |
| GB | 2 329 499 A | 3/1999 |
| GB | 2 342 744 A | 4/2000 |
| JP | 11/338826 | 12/1999 |
| WO | 99/50734 A1 | 10/1999 |
| WO | 01/65375 A1 | 9/2001 |
| WO | 01/82190 A1 | 11/2001 |
| WO | 03/062969 A1 | 7/2003 |

OTHER PUBLICATIONS

C.B. Shelman, "Fingerprint Classification—Theory and Application" Proc. 76 Carnahan Conference on Electronic Crime Countermeasures, 1976.

Feri Pernus, Stanko Kovacic, and Ludvik Gyergyek, "Minutaie Based Fingerprint Registration" IEEE Pattern Recognition, pp. 1380, 1980.

J.A. Ratkovic, F.W. Blackwell, and H.H. Bailey, "Concepts for a Next Generation Automated Fingerprint System" Proc. 78 Carahan Conference on Electronic Crime Countermeasures, 1978.

K. Millard, "An Approach to the Automatic Retrieval of Latent Fingerprints" Proc. 75 Carahan Conference on Electronic Crime Countermensures, 1975.

Moayer and K.S. Fu, "A Syntactic Approach to Fingerprint Pattern Recognition" Memo Np. 73-18, Purdue University, School of Electronic Engineering. 1973.

Wegstein, An Automated Fingerprint Identification System, NBS special publication, U.S. Department of Commerce/National Bureau of Standards, ISSN 0083-1883; No. 500-89, 1982.

Wegstein and J.F. Rafferty, The LX39 Latent Fingerprint Matcher, NBS special publication, U.S. Department of Commerce/National Bureau of Standards; No. 500-36, 1978.

Harvey, Mike. "Why veins could replace fingerprints and retinas as most secure form of ID." *Times Online* Nov. 11, 2008 <http://technology.timesonline.co.uk/tol/news/tech_and_web/articles5129384.ece>.

Moenssens, Andre A., Fingerprint Techniques, Chilton Book Co., 1971.

Non-Final Office Action for U.S. Appl. No. 11/508,463; Mailed on Jul. 8, 2010; 24 pages.

Final Office Action for U.S. Appl. No. 11/508,463; Mailed on Dec. 17, 2010; 34 pages.

European Search Report for EP1176489; Mailed on Feb. 3, 2005; 3 pages.

Examination Report for EP1176489; Mailed on Jun. 27, 2007; 4 pages.

European Search Report for EP1603003; Mailed on Oct. 10, 2005; 3 pages.

Examination Report for EP1603003; Mailed on Apr. 19, 2007; 5 pages.

Decision to Refuse for EP1176489; Mailed on Jan. 12, 2011; 9 pages.

EPO Communication for EP1176489; Mailed on Feb. 17, 2006; 5 pages.

Yesberg, J.D. et al. "Quantitative Authentication and Vouching", *Computers & Security*, Elsevier Science Publishers. Amsterdam, NL, vol. 15, No. 7, Jan. 1, 1996, pp. 633-645.

European Patent Office, Extended European Search Report, European Patent Application 10185106.1, applicant Activcard Ireland Limited et al., Mar. 25, 2011.

European Patent Office, European Search Report, EP Application 01117879.5, Jan. 27, 2005, 2 pages.

United States Patent and Trademark Office, Non-Final Office Action, U.S. Appl. No. 13/601,758, mailed Sep. 6, 2013, 21 pages.

United States Patent and Trademark Office, Non-Final Office Action, U.S. Appl. No. 11/508,463, mailed Mar. 19, 2012, 31 pages.

United States Patent and Trademark Office, Notice of Allowance, U.S. Appl. No. 11/508,463, mailed Jun. 25, 2012, 12 pages.

United States Patent and Trademark Office, Non-Final Office Action, U.S. Appl. No. 09/625,548, mailed Jul. 1, 2004, 18 pages.

United States Patent and Trademark Office, Final Office Action, U.S. Appl. No. 09/625,548, mailed Apr. 20, 2005, 18 pages.

United States Patent and Trademark Office, Notice of Allowance, U.S. Appl. No. 09/625,548, mailed Dec. 12, 2005, 8 pages.

United States Patent and Trademark Office, Notice of Allowance, U.S. Appl. No. 13/601,758, mailed Mar. 4, 2014, 9 pages.

* cited by examiner

FLEXIBLE METHOD OF USER AUTHENTICATION

CROSS-REFERENCE TO RELATED APPLICATIONS:

This application is a continuation in part of U.S. patent application Ser. No. 09/625,548 Filed: Jul. 25, 2000 (U.S. Pat. No. 7,137,008), which is hereby incorporated by reference in its entirety.

FIELD OF THE INVENTION

This invention relates generally to authorization of individuals and more particularly relates to a method of authorizing a user at a workstation according to a security policy that is dependent upon previously stored policy data and data relating to the workstation that is for use by the user.

BACKGROUND OF THE INVENTION

Computer security is fast becoming an important issue. With the proliferation of computers and computer networks into all aspects of business and daily life—financial, medical, education, government, and communications—the concern over secured file access is growing. Using passwords is a common method of providing security. Password protection and/or combination type locks are employed for computer network security, automatic teller machines, telephone banking, calling cards, telephone answering services, houses, and safes. These systems generally require the knowledge of an entry code that has been selected by a user or has been pre-set.

Pre-set codes are often forgotten, as users have no reliable method of remembering them. Writing down the codes and storing them in close proximity to an access control device (i.e. the combination lock) results in a secured access control system with a very insecure code. Alternatively, the nuisance of trying several code variations renders the access control system more of a problem than a solution.

Password systems are known to suffer from other disadvantages. Usually, a user specifies passwords. Most users, being unsophisticated users of security systems, choose passwords that are relatively insecure. As such, many systems protected by passwords are easily accessed through a simple trial and error process.

A security access system that provides substantially secured access and does not require a password or access code is a biometric identification system. A biometric identification system accepts unique biometric information from a user and identifies the user by matching the information against information belonging to registered users of the system. One such biometric identification system is a fingerprint recognition system.

In a fingerprint input transducer or sensor, a finger tip is usually pressed against a flat surface, such as a side of a glass plate. The ridge and valley pattern of the finger tip is sensed by a sensing means such as an interrogating light beam. Fingerprint characterization is well known and involves many aspects of fingerprint analysis.

An example of the use of fingerprint for securing access to a protected system is provided by the U.S. Pat. No. 5,229,764 to Matchett et al. There is disclosed a method of continuously analyzing biometric data from a biometric input device at intermittent intervals and selectively granting or denying access to a particular protected system based on the biometric input. The system is a continuous biometric authentication, which reads from a variety of biometric personal identification devices. The system acts as a continuously functioning "gate" between a protected system and a prospective user. Biometric data pertaining to a prospective user is stored for reference within the system. Upon a prospective user wishing to gain access to the protected system the user must interface with the system, which compares the prospective user's biometric data to the stored reference data. This comparison must not only be acceptably close in similarity in order to gain access to the protected system, it must also continue to be close in subsequent comparisons in order for access to the protected system or device to continue.

Computer networks typically store information such as user profiles, user authorization for access and vast amounts of data. End user terminals are a critical component of the computer network, in that they provide external access to the network by offering a means of transmitting input data to the network and by offering a means of reading information from the network. Each of these terminals poses a security risk to data stored on the network and controlling unauthorized access to the data stored on the network is of critical importance. Though biometric authentication is a secured means of identifying a user, it has not penetrated the marketplace sufficiently to be implemented on most desktop computers. Furthermore, most end user terminals are not equipped with a biometric data input device. Since most forms of biometric authentication require specialized hardware, market penetration is slow and requires both acceptance of the new hardware and a pressing need.

Typical uses of user authentication include system access, user identification, and access to a secured key database. Often a secured key database is encrypted with a key that is accessible through user authentication or identification.

Key management systems are well known. One such system, by Entrust® Technologies Limited, is currently commercially available. Unfortunately, current key management systems are designed for installation on a single computer for use with a single fixed user authorization method and for portability between computers having a same configuration. As such, implementation of enhanced security through installation of biometric input devices is costly and greatly limits portability of key databases. Password based protection of key databases is undesirable because of the inherent insecure nature of most user selected passwords.

In the past, a system was provided with a single available security system. Typically, prior art systems require a password. Alternatively, a system could require a password and a biometric, or another predetermined combination of user authorization information. Unfortunately, passwords are inherently insecure. Further, because of the limited number of workstations equipped with biometric scanners and so forth, it is difficult to implement a system secured with biometrics.

One variation in the above systems is access from external locations. Typically, organisations have a further security process for remote access to their sites, the further process required passing through a gateway into their sites. Thus, a user wishing remote access to a system must pass a first level of security to gain access to the network and another level of security to gain access to data stored therein. Both of these security processes are fixed and are implemented automatically when users try to pass through secured access gateways.

It would be advantageous to provide a method of user authorization that is flexible enough to work on different workstations and to accommodate user needs of different users at those different workstations. It is therefore an object of the invention to determine an authorization procedure for execution on a workstation based upon stored policy data.

SUMMARY OF THE INVENTION

In accordance with the invention there is provided a method of authorizing a user in communication with a workstation that is in communication with a server comprising: providing data relating to the workstation to the server; determining at the server based upon the data relating to the workstation and on previously stored policy data at least an authorization method for authorizing the user; receiving by the workstation of user data from the user; and, registering the user data against previously stored user data in accordance with the determined at least an authorization method to perform at least one of identifying and authorizing the user in dependence upon the data relating to the workstation.

In accordance with the invention there is provided a method of authorizing a user for providing secure access to a data with a predetermined level of security: providing a workstation in communication with a server; providing first data from the workstation to the server, the first data relating to the workstation, the first data being different for a same workstation under different security affecting operating conditions; determining based on the first data and a security policy, an authorization method for use by a user of the workstation, the authorization method for providing at least the predetermined level of security in light of the first data and selected from a plurality of authorization methods; and authorizing a user of the workstation in accordance with the authorization method for providing access to second data from the server, the provided access having at least the predetermined level of security.

In accordance with the invention there is provided a system for authorizing a user for providing secure access to a data with a predetermined level of security comprising: a workstation in communication with a server; means for providing first data from the workstation to the server, the first data relating to the workstation, the first data being different for a same workstation under different security affecting operating conditions; means for determining based on the first data and a security policy, an authorization method for use by a user of the workstation, the authorization method for providing at least the predetermined level of security in light of the first data and selected from a plurality of authorization methods; and means for authorizing a user of the workstation in accordance with the authorization method for providing access to second data from the server, the provided access having at least the predetermined level of security. The programmatic information to perform one or more of the above described methods may be stored in a tangible form including optical storage media, magnetic storage media, or logical storage media. The programmatic information includes compiled object code, compilable source code or byte code, or interpretable source or byte code.

BRIEF DESCRIPTION OF THE DRAWINGS

An exemplary embodiment of the invention will now be described in conjunction with the attached drawings, in which.

DETAILED DESCRIPTION OF EMBODIMENTS OF THE INVENTION

Figure 1:
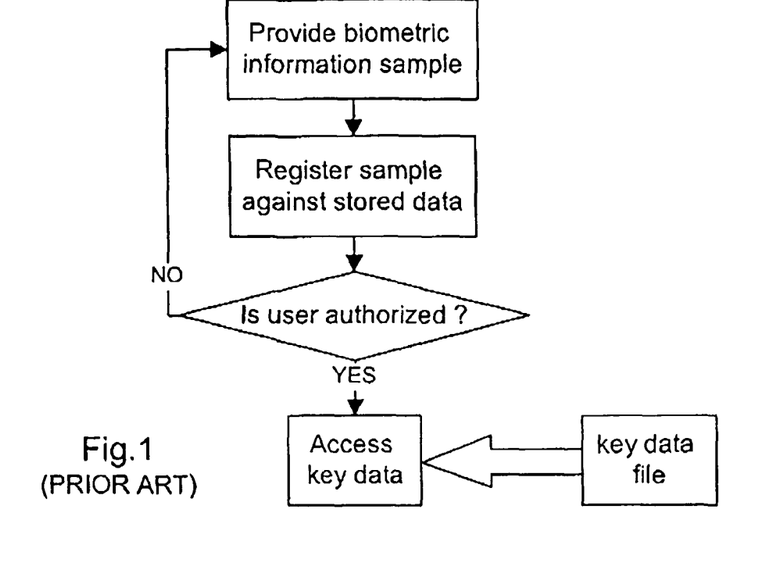
FIG. 1 illustrates a flow diagram of a prior art method of accessing secured data.

Referring to FIG. 1, a simplified flow diagram of a prior art method of accessing secured data is shown for use in a network comprising a plurality of computers each having a biometric imaging device. A key data file comprises a cryptographic key, which is secured using a biometric authentication method. According to the method, biometric authentication is required to access the cryptographic key. For example, the cryptographic key is encrypted using a key secured by the biometric information. Upon presentation of appropriate biometric information, the secured cryptographic key is accessed, the cryptographic key is decrypted and the decrypted cryptographic key is used to encrypt or decrypt data files. The method of accessing the cryptographic key is predetermined and is unchanging in nature. Of course, other methods of securing cryptographic keys using biometric authentication are also applicable. For example, secured key locations are determinable by the user authentication process. Thus, if a key is secured using a fingerprint, access is through provision and analysis of a fingerprint and it is therefore necessary to outfit each system where a user may require access to the key with a biometric imaging device. Similarly, when the key is secured with a token, such as a smart card, the token interface must be installed on each system where the user may require access to the key. Presently, it is common to secure the key with a user password since almost all systems are equipped with a keyboard. Unfortunately, user passwords suffer from many security related disadvantages.

For convenience, key data files are typically transportable in the form of an encrypted data file containing the key data and security data necessary to access the encrypted data file. Unfortunately, each other computer system to which the key data file is transported must support a same authentication process in order to provide access to the key data file. For example, when the second computer has no biometric information input device, the user authorization method for accessing the secured key cannot be executed and the secured key is not accessible. Without the secured key, the encrypted cryptographic key data cannot be accessed when desired. Alternatively, a method of extracting the keys from the key data file absent user authentication is necessary. Such a method is not desirable since it greatly reduces security. This exemplary problem is analogous to problems in network access, file access, network security, document authentication, and so forth.

Figure 2:
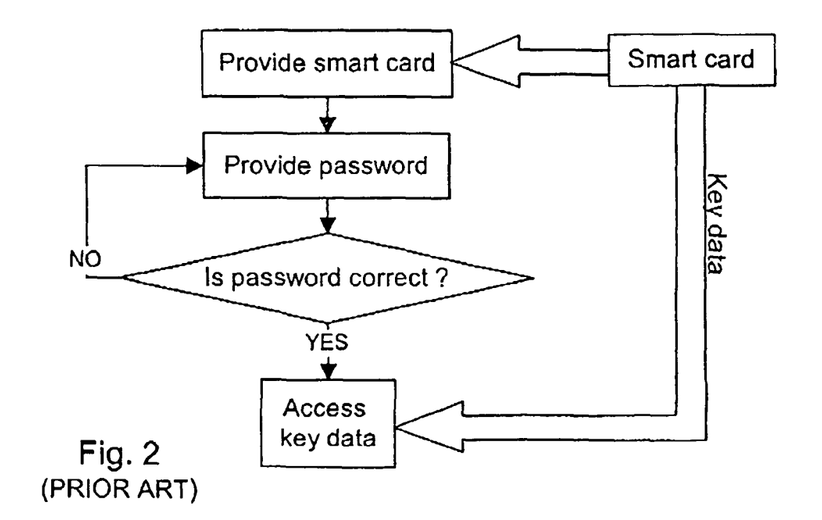
FIG. 2 illustrates a flow diagram of a prior art method of accessing secured data.

Referring to FIG. 2, a prior art method of accessing secured data using a smart card based verification process, but absent a biometric verification process, is shown. In this system, a user password, or card based user authentication, is employed. A smart card having a key data file stored therein is placed into a smart card reader. A user is prompted for user authentication in the form of a user password. Once the user password is verified, access to the cryptographic key is permitted and encrypted data files are accessible. One such method is to employ the password or a predetermined portion thereof as a key for encrypting the cryptographic key. Another such method involves providing access to a secured key upon verification of the password and using the secured key to access the cryptographic key. As is evident to those of skill in the art, conventional key data files cannot be transferred from a system employing a method, such as that of FIG. 1, to a system employing a different method, such as that of FIG. 2. Because of this, prior art systems are typically operated in a less than secured fashion. Alternatively, transportability and remote access is reduced where biometric user authentication is conducted. Further, expenses are greatly increased in providing a homogenous hardware and software base for all systems within an organization.

Figure 3A:
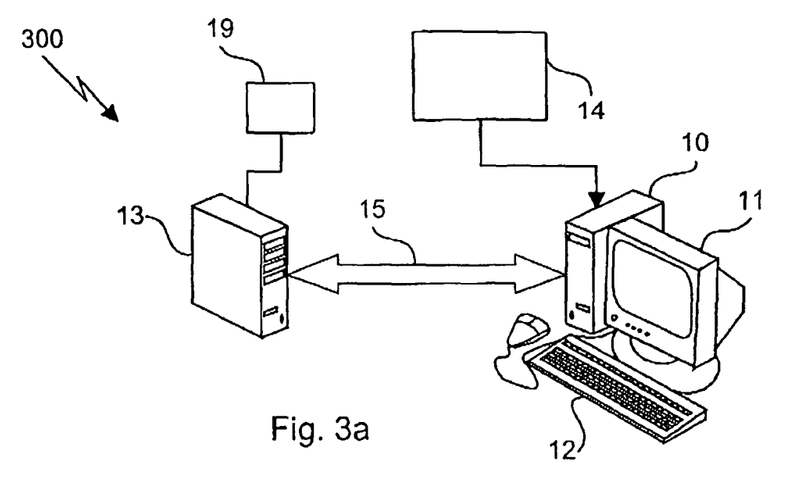
FIG. 3a illustrates a simplified diagram of a network, that includes a local workstation, in accordance with an embodiment of the present invention.
Figure 3B:
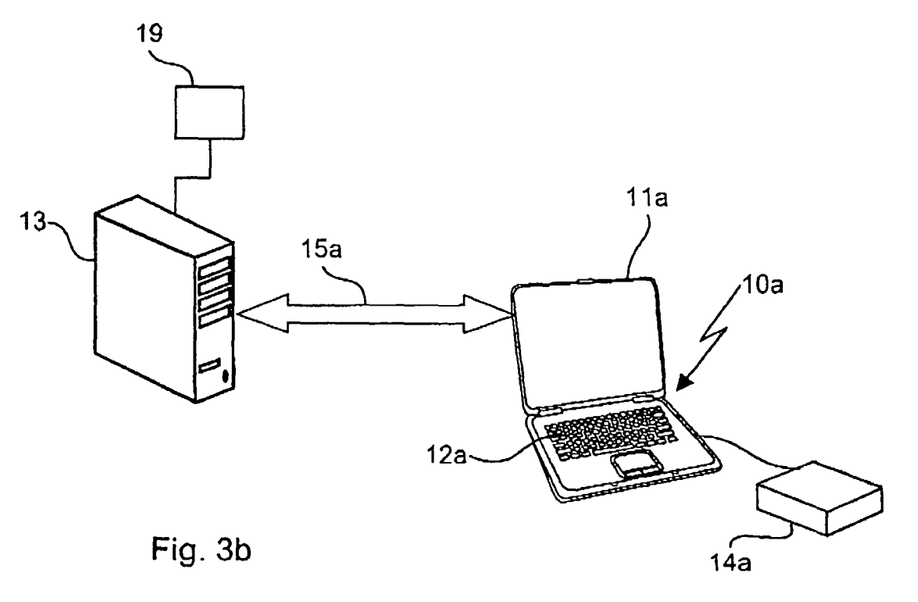
FIG. 3b illustrates a simplified diagram of a network, that includes a remote workstation, in accordance with an embodiment of the present invention.

Referring now to FIGS. 3a, 3b, a simplified diagram of a computer network 300 that includes a workstation 10 comprising a monitor 11 and a keyboard 12 connected to a server 13 through a communication link 15 is shown in accordance with a first embodiment of the invention. A user data input device 14 is coupled to the workstation 10 for communicating therewith. The user data input device 14 is in the form of, for example, a smart card reader, a biometric sampling device such as a fingerprint imager, a voice recognition system, a retinal imager or the like. The keyboard 12 utilized for optionally typing a password when added security is concerned. The computer network 300 comprises a security server 13 for storing of policy data and a data server 19 for providing of secured data to the workstation 10 using the communication link 15. The security server 13 is also for controlling access to secured data stored on the data server 19. Referring to FIG. 3b, a mobile workstation 10a is shown that is connected to the security server 13 using an unsecured communication link 15a, which is, for example, provided by, at least in part, using a wireless connection, or a telephone line connection, or some other form of publicly used connection. This type of connection is differentiated from communication link 15 in that communication link is 15 is of the type typically found in a secured environment, such as a military headquarters. The mobile workstation 10a includes a keyboard 12a, a portable user data input device 14a, a display 11a and a communication link for communicating with the secured server using the unsecured communication link 15a.

A user desiring access to secured data stored in the data server 19 of the computer network 300 provides their user information to the user data input device, 14 or 14a, which is in communication with the workstation 10, or mobile workstation 10a, respectively. Upon the provision of their information to the user data input device 14 or 14a, the workstation 10 or 10a provides the user data and workstation data to the security server 13 via the communication link, 15 or 15a, respectively.

At the security server 13, in dependence upon data relating to the workstation and on previously stored policy data, an at least an authorization method for authorizing the user is determined. Furthermore the security server performs an operation of registering the user data against previously stored user data in accordance with the determined at least an authorization method. Thereafter, the security server identifies the user and optionally authorizes the user to access secured data in dependence upon the data relating to the workstation and the user data. Optionally, in order to increase security further, the security policy is determined from a plurality of predetermined security policies based on previously stored policy data and data relating to the workstation, where determining of the at least an authorization method for the user is according to the determined security policy.

Of course, in dependence upon the user data and the workstation data, such as the geographical location thereof, the authorization method is varied because a security policy that depends upon the previously stored policy data and the user data is different. Of course, even after authentication, the user does not necessarily have access to secured data stored on the server 19. In some cases because of the user data and the workstation data, the user is denied access to the secured data.

Preferably the workstation, 10 or 10a, transforms the user information in such a manner that it is transmittable using the communication link, 15 or 15a, even when the communication link, 15 or 15a, is unsecured. The transformation of the user data is such that it is transmitted along with other data risking potential deciphering of the user information during transmission. Such transformation includes, for example, encrypting or hashing the user information using keys or hashing algorithms.

Figure 4:
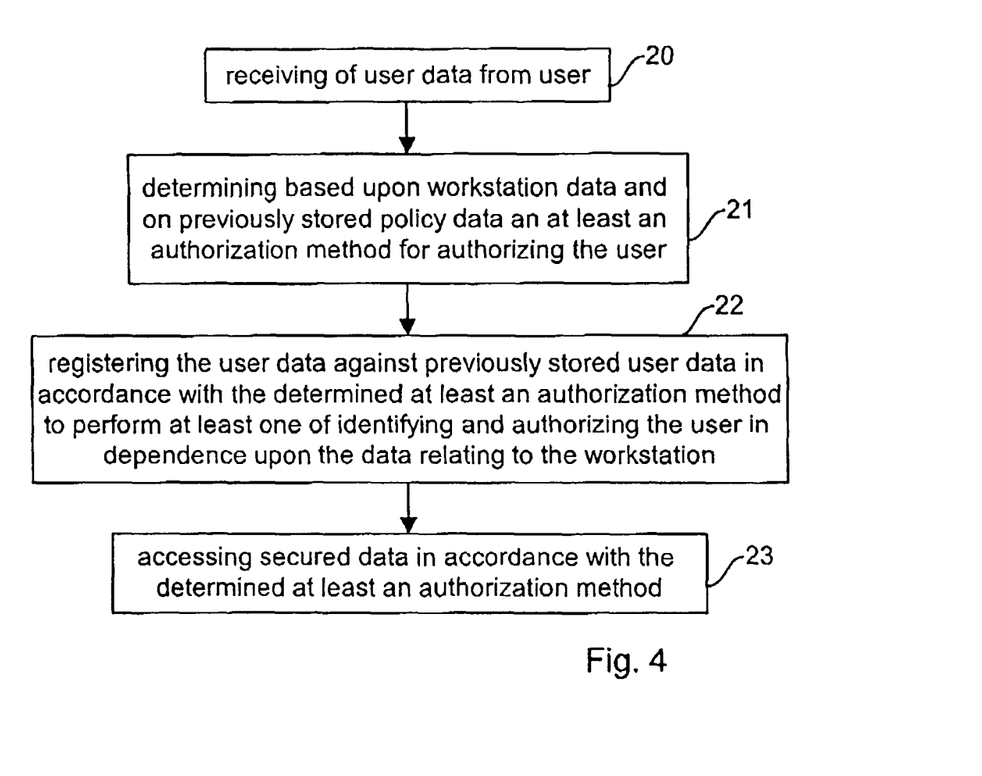
FIG. 4 illustrates a first flow diagram of a method of performing user authentication in accordance with an embodiment of the invention; and, FIG. 5 illustrates a second flow diagram of a method of performing user authentication in accordance with an embodiment of the invention.

Alternatively, when access to the secured data is requested, the security server 13 receives the geographical location of the workstation, 10 or 10a, from which the request has originated. FIG. 4 illustrates a flowchart in accordance with the preferred embodiment of the invention for a method of obtaining secured access to secured data stored on the server 19 that forms part of the computer network 300. The method is based on previously stored policy data, which determines the at least an authorization method for authorizing the user. The previously stored policy data, for example, takes into account a type of user data input device, 14 or 14a, a geographical location of the workstation, 10 or 10a, and the type of communication link 15 or 15a between the workstation 10 or 10a and the security server 13.

Referring to FIG. 4, steps for authorizing of a user in communication with a workstation, 10 or 10a, are shown. The user interacts with the user data input device 14 or 14a, the workstation, 10 or 10a, receives 20 user data from the user data input device, 14 or 14a, in communication with the workstation, 10 or 10a.

In dependence upon workstation data and on previously stored policy data an at least an authorization method for authorizing the user is determined 21. The user data is then registered 22 against previously stored user data in accordance with the determined at least an authorization method to perform at least one of identifying and authorizing the user in dependence upon the data relating to the workstation. In dependence upon combinations of user data and workstation data, the security server 13 determines different methods for authorization the user and in dependence upon. Granting the user access 23 to the secured data is in accordance with the determined at least an authorization method. For example, the identifying and authorizing of the user is dependent upon a geographical location of the mobile workstation 10a.

In dependence upon the type of access being sought by the user, the previously stored policy data determines the type of user data that is required from the security device. Further optionally, the authentication of the user is dependent upon a time that the request for authentication is being made. If, for example, the stored policy data determines that the type of request and the type of communication link between the workstation, 10 or 10a, and the security server 13 requires added security, then the user is prompted to provide user data to the user data input device at random intervals. Examples of user data are biometric data and password data, but are not limited thereto.

Optionally, in dependence upon a set of user data received from the user data input device, 14 or 14a, a further authorization method is determined in dependence upon a further set of user data received from a further user data input device. The workstation, 10 or 10a, for example, receives biometric data from the user data input device in the form of a fingertip contact imaging sensor and additionally prompts the user for a password to be entered on the keyboard, 12 or 12a.

Referring to FIGS. 3a and 3b, with the use of the security processor 16, an attempt to access secured data or perform an operation is detected by the security processor 16 pertaining to the computer network 300. A processor from the workstation 10 determines the type of user data input device, 14 or 14a, connected to the workstation and sends user data to the security processor 16. According to the authorization procedure performed and the trustworthiness of the user data input device, the user is authorized to perform operations only within predetermined limits indicated by the security level.

Accordingly, policy data is dependent upon any plurality of parameters about the workstation, 10 or 10a, and its communication link, 15 or 15a, to the security server 13.

Figure 5:
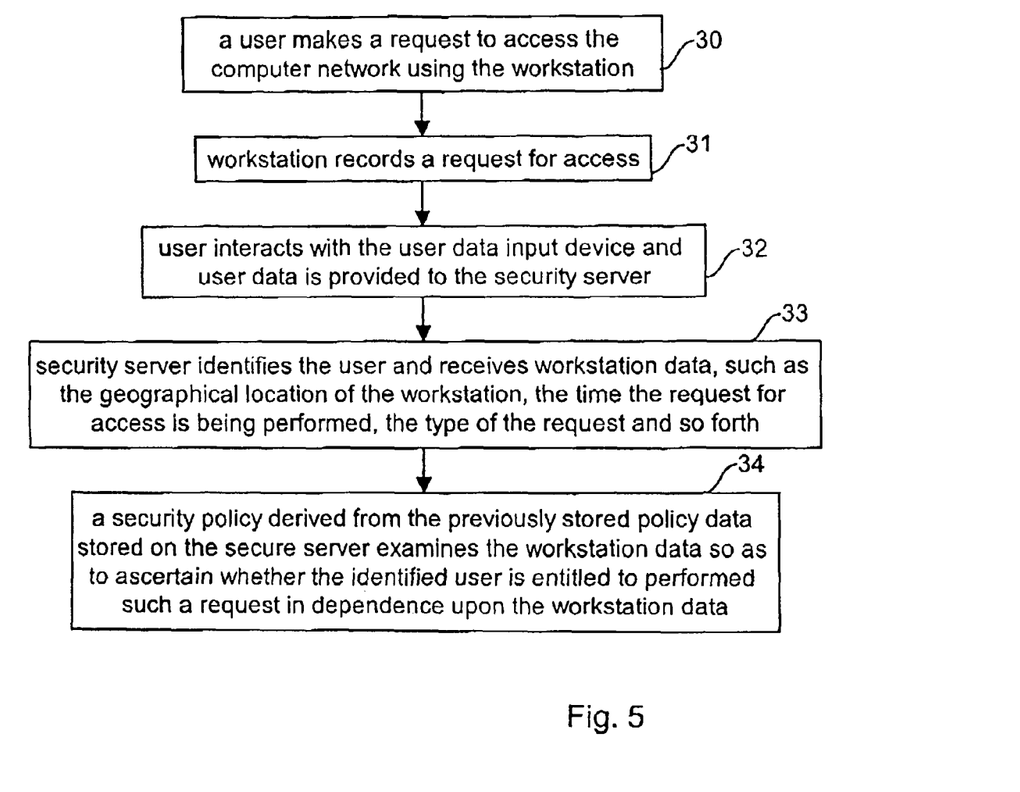

For example, a geographical location of the workstation, 10 or 10a, is used for forming a portion of the previously stored policy data. Also, a user ID optionally forms a portion of the previously stored policy data. Other examples of parameters that affect the previously stored policy data are: the date, the time, the day of the week, the country, the data being accessed, the communication link, 15 or 15a, between the workstation, 10 or 10a, and the security server 13, the available user data input devices, 14 or 14a, the type of secured data being requested from the data server 19, and so forth. As such, a portable workstation 10a that is presently geographically located in a less than secured location, preferably utilizes "high" security authentication process while the same workstation, for example workstation 10, within a corporate headquarters utilizes a more "normal" level of security authentication. Referring now to FIG. 5, a user makes 30 a request to access the computer network 300 using the workstation, 10 or 10a, and the user data input device, 14. The workstation 10 records 31 a request for access. User interacts 32 with the user data input device, 14 or 14a, and user data is provided to the security server 13 using the communication link, 15 or 15a. The security server 13 identifies 33 the user and receives characteristic information about the workstation, 10 or 10a. The characteristic information about the workstation is, for example, the geographical location of the workstation, the time the request for access is being performed, the type of request and so forth. The security policy resulting from the policy data stored on the secured server 13 examines the workstation data to ascertain 34 whether the identified user is entitled to performed such a request from where the workstation 10 is geographically located. In dependence upon the security policy and the geographical location of the workstation, 10 or 10a, an at least an authorization method in accordance with the previously stored policy data is selected.

For example in accordance with the security policy no access is to be provided between midnight and 6:00 am, the user requesting an access during this period of time is automatically denied access.

To facilitate the understanding of the invention an example utilizing military security server access will be used to accompany the description of the preferred embodiments.

Referring to the apparatus shown in FIG. 3b, and the flow diagrams shown in FIGS. 4 and 5, in this example, a general at a remote location wishes to gain access to the secured server 19. The general is equipped with the portable workstation 10a at the remote location. Using the user data input device 14a, in the form of the keyboard 12a and a biometric sensor, the general provides a password using the keyboard 12 and provides biometric information to the biometric sensor. The security server 13 receives the geographical location of the workstation 10a and the security server 13 identifies the general. After identification, the policy data is consulted and a method of authentication is determined for general at the workstation 10a in its surrounding environment.

Referring to the same example, the general's country is part of an international treaty. Thus the general travels from time to time to one of the allied countries. The general has brought the portable workstation 10a, because it is already configured and the user is familiar to such configuration, in order to access the computer network 300.

This remote workstation 10a facilitates the general's work during the flight, for example. Access to the secured data stored within the computer network 300 is achievable from any portable workstation 10a that has capabilities for connection to the security server 13 using the communication link 15a. In an attempt to access sensitive data stored within the computer network 300 using the portable workstation 10a, the security server 13 detects that the access request originates from an allied foreign country. The security server 13 consults the previously stored policy data in order to determine the security policy the most adequate method of authentication in such a case. When located in an allied country, the previously stored policy data indicates that for being allowed to access the secured data, the general has to regularly authenticate using the user data input device 14a. Because of the nature of the data being access by the general, the interval between two successive authentication procedures is determined to be short in accordance with the previously stored policy data. Thus, for example, the general is prompted to re-authenticate at 5 minute intervals. This prevents access to the secured data when the portable workstation 10a is left unattended for a period of time lasting more than 5 minutes, for example. Alternatively, the previously stored policy data randomly selects a fingerprint to be imaged and prompts the general to provide the randomly selected fingertip on the biometric sensor forming part of user data input device 14a. The authentication verification is, in this case, based upon the use of biometric authentication, thus the previously stored policy data requires a false acceptance (FA) of 1/1,000,000 authentication with a FA of 1/10,000,000 every 15 minutes, which is every third time.

Preferably, the communication link 15a employed between the portable workstation 10a and the security server 13 employs a secured data exchange-encrypted data that is encrypted with an encryption key, or keys—between the portable workstation 10a and the security server 13.

In another example, the general also travels to non-allied countries for various reasons including, for example, for prospecting purpose and for meeting with non-allied military high ranked people. When travelling in a non-allied country, the general brings the portable workstation 10a for communicating with the security server 13. The portable workstation 10a that is assigned to the general is utilized because it is already configured for communicating with the secured server 13 and because the security policy has a prerequisite that the general access the security server 13 from the portable workstation 10a. Thus, preferably before the general takes the remote workstation 10a to an unsecured location, the software and hardware used for accessing of the security server 13 are verified and authenticated. For example, before departure from the military headquarters, the remote workstation is verified to ascertain that all the systems are trusted for communicating with the security server 13.

Optionally, as a further security protection, the remote workstation 10a is configured such that the secured files accessed from a foreign country are read only files and only the scroll down function is used in order to read them on the screen. Further optionally, the files continuously scroll in order to render difficulty in photographing the screen 11a of the remote workstation 10a.

Because the general is in a non-allied country, the authentication of a FA of 1/10,000,000 every 3 minutes and to a FA of 1/100,000,000 every 15 minutes, which is every fifth time is utilized, for example. The security policy, for example, indicates that at least three fingerprints randomly selected are to be provided to the user data input device 14a every three minutes.

In another example, it is inferred that an office at the military headquarters is considered a secured location. Furthermore, to reach the office, the general had already been subjected to various check points, for example personal verification with a security guard at the entrance gate of the headquarter. Eventually, the general also provides verification data for accessing the parking area, or an elevator for reaching the office floor. Thus, the security system at the military headquarters has a plurality of additional user data input devices for identifying and for performing verification about the general before the general tries to access data on the computer network 300.

Once the general is at the office and at the workstation 10, biometric information is still provided to a biometric sensor, forming part of the user data input device 14, and optionally a password is provided to the keyboard 12. Because the general is within the confines of the military headquarters, the information exchanged between the workstation 10 and the security server 13 is sent using a communication link 15 that is secured. As such, it is highly unlikely that the network communication link 15 is unprotected.

Optionally, certain files that are stored in the computer network 300 are considered sensitive and are protected such that their access is allowed from the workstation 10 in the general's office but these files cannot be saved on a mobile workstation 10a for future access. The mobile workstation 10a does not facilitate storing of these secured files because it is portable and is transported to unsecured locations. Of course, for other types of files, such as social events, headquarter phone lists, or for any general information stored within the network 300, authentication procedures supported by a sophisticated requirement from the security policy are not necessitated.

The secured data stored on the data server 19 is accessible by many users that are part of an organization and that are connected to the security server using a plurality of communication links 15. Of course, in dependence upon the user identification, the security policy is optionally different depending on the hierarchy within the organization. So, for example, when a sergeant attempts to access the secured data from the secured server 14 from their office located within the confines of the headquarters or from a conference room in an allied country, the sergeant is submitted to the same security protocol than the general. However, when the sergeant is requesting access to the secured data from a non-allied country, the access is automatically denied.

Similarly, when a higher ranked officer, a lieutenant for example, requests access to the secured data from a non-allied country, the security policy requires that another officer having at least the same rank is also permanently present and periodically identified using the user data input device 14a, where both officers are subject to authentication using the user data input device 14a coupled with the remote workstation 10a.

Advantageously, a security system based on security policy is flexible, which allows for many variations and adaptations according to external circumstances. For example, the general's remote workstation 10a crashes 5 minutes before the beginning of a meeting in a non-allied country. A security policy requires that to use another remote workstation, at least two user data input devices, for example a smart card reader and a biometric sensor, be connected to the another remote workstation. In such a case, by downloading the information stored on the smart card, the configuration of another remote workstation is adapted such that it is preferably accepted by the security server 13. Of course, the security policy derived from the previously stored policy data in such condition is not identical to the previous one and it requests that the general authenticates to a FA of 1/100,000,000 every 3 minutes.

As it is apparent to a person with skill in the art, the embodiments of the invention are not limited to military security but are adaptable to any system that is for protection of data and the protection of data exchange.

Numerous embodiments may be envisaged without departing from the spirit and scope of the invention.

What is claimed is:

1. A method of authorizing a user to access a workstation using a security server, the method comprising:
   receiving security data relating to computing conditions in which an authorization will be performed, wherein the security data comprises at least one indication of a type of communication link between the workstation and the security server, a geographic location of the workstation, or a time of access of the workstation;
   determining a security policy from a plurality of predetermined security policies based on previously stored policy data and the received indication of the type of communication link between the workstation and the security server, the geographic location of the workstation, or the time of access of the workstation;
   determining an authorization method for authorizing the user, wherein the authorization method is determined from the determined security policy in accordance with the received indication of the type of communication link between the workstation and the security server, the geographic location of the workstation, or the time of access of the workstation;
   receiving user identification data; and
   registering the user identification data against stored user data in accordance with the determined authorization method, wherein different authorization methods for authorizing the user are determined upon receipt of different security data, and wherein the security data does not include identification information for a particular user.

2. The method according to claim 1 wherein the authorization method comprises prompting the user to provide the user identification data at random time intervals.

3. The method according to claim 1 wherein the security data comprises the geographic location of the workstation.

4. The method according to claim 3, further comprising analyzing the geographic location of the workstation and, based on the analysis, determining whether the workstation is in a secure location.

5. The method according to claim 1 wherein the security data further comprises data relating to available user data input devices for providing input to the workstation.

6. The method according to claim 1 wherein the security data further comprises data identifying a type of secured data being requested from the security server by the workstation.

7. The method according to claim 1 wherein the user identification data is biometric data.

8. The method according to claim 1, further comprising allowing the user to access secured data in accordance with the determined authorization method.

9. A method of authorizing a user to access secure data having a predetermined level of security via a workstation, the method comprising:
acquiring security data relating to computing conditions in which an authorization will be performed, wherein the security data comprises at least one indication of a type of communication link between the workstation and the secure data, a geographic location of the workstation, or a time of access of the workstation, and wherein the security data is different for the workstation under different security-affecting operating conditions;
determining a security policy from a plurality of predetermined security policies based on previously stored policy data and the acquired indication of the type of communication link between the workstation and the security server, the geographic location of the workstation, or the time of access of the workstation;
determining an authorization method for authorizing the user, wherein the authorization method is selected from a plurality of authorization methods based on the security data and the determined security policy; and
authorizing the user with the authorization method for providing access to the secure data via the workstation, wherein different authorization methods for authorizing the user are determined upon receipt of different security data, and wherein the security data does not include identification information for a particular user.

10. The method according to claim 9 wherein the authorizing comprises prompting the user to provide user identification data at random time intervals.

11. The method according to claim 9 wherein the security data comprises the geographic location of the workstation.

12. The method according to claim 11, further comprising analyzing the geographic location of the workstation and, based on the analysis, determining whether the workstation is in a secure location.

13. The method according to claim 9 wherein the security data further comprises data relating to available user data input devices for providing input to the workstation.

14. The method according to claim 9 wherein the security data further comprises data identifying a type of secure data being accessed by the user.

15. The method according to claim 9 wherein the authorizing comprises providing biometric data of the user to a biometric authentication device.

16. The method according to claim 9, further comprising allowing the user to access the secure data in accordance with the determined authorization method.

17. A system for authorizing a user to access secure data having a predetermined level of security, the system comprising:
a workstation configured to provide security data relating to computing conditions in which an authorization will be performed, wherein the security data comprises at least one indication of a type of communication link between the workstation and the secure data, a geographic location of the workstation, or a time of access of the workstation, and wherein the security data is different for the workstation under different security-affecting operating conditions;
a security server configured to—
determine a security policy from a plurality of predetermined security policies based on previously stored policy data and the indication of the type of communication link between the workstation and the security server, the geographic location of the workstation, or the time of access of the workstation; and
determine an authorization method for a user of the workstation, wherein—
the authorization method provides at least a predetermined level of security corresponding to the indication of the type of communication link between the workstation and the security server, the geographic location of the workstation, or the time of access of the workstation; and
the authorization method is selected from a plurality of authorization methods based on the indication of the type of communication link between the workstation and the security server, the geographic location of the workstation, or the time of access of the workstation; and
different authorization methods for authorizing the user are determined upon receipt of different security data, and wherein the security data does not include identification information for a particular user;
wherein the workstation is further configured to provide user identification data in accordance with the determined authorization method; and
wherein the server is further configured to use the user identification data to authorize the user in accordance with the authorization method.

18. The system according to claim 17 wherein—
the determined authorization method specifies a biometric authentication device; and
the workstation comprises the biometric authentication device which the workstation uses to obtain the user identification data in accordance with the determined authorization method.

19. A computer-readable storage device having instructions stored thereon, the instructions comprising:
instructions for receiving security data relating to computing conditions in which an authorization will be performed, wherein the security data comprises least one indication of a type of communication link between the workstation and the security server, a geographic location of the workstation, or a time of access of the workstation;
instructions for determining a security policy from a plurality of predetermined security policies based on previously stored policy data and the indication of the type of communication link between the workstation and the security server, the geographic location of the workstation, or the time of access of the workstation;
instructions for determining an authorization method for authorizing the user, wherein the authorization method is determined from the security policy in accordance with the received indication of the type of communication link between the workstation and the security server, the geographic location of the workstation, or the time of access of the workstation;
instructions for receiving user identification data; and
instructions for registering the user identification data against stored user data in accordance with the determined authorization method to authorize the user, wherein different authorization methods for authorizing the user are determined upon receipt of different security data, and wherein the security data does not include identification information for a particular user.

20. A security server for authorizing a user to access secure data having a predetermined level of security via a user workstation, the security server comprising:

an input device configured to receive security data relating to computing conditions in which an authorization will be performed, wherein the security data comprises at least one indication of a type of communication link between the user workstation and the secure data, a geographic location of the user workstation, or a time of access of the user workstation, and wherein the security data is different for the user workstation under different security affecting operating conditions; and a processing device configured to:

determine a security policy from a plurality of predetermined security policies based on previously stored policy data and the indication of the type of communication link between the workstation and the security server, the geographic location of the workstation, or the time of access of the workstations;

determine an authorization method for authorizing the user workstation, wherein the authorization method is selected from a plurality of different authorization methods based on receipt of different security data and the determined security policy, and wherein the security data does not include identification information for a particular user, and wherein the provided access has at least the predetermined level of security.

21. The security server according to claim 20 wherein the input device receives biometric data of the user from a biometric authentication device and provides the biometric data to the processing device for processing in accordance with the authorization method.

22. A security server for authorizing a user to access a workstation, the security server comprising:

an input device that receives security data relating to computing conditions in which an authorization will be performed, wherein the security data comprises at least one indication of a type of communication link between the workstation and the security server, a geographic location of the workstation, or a time of access of the workstation; and a processing device that— determines a security policy from a plurality of predetermined security policies based on previously stored policy data and the indication of the type of communication link between the workstation and the security server, the geographic location of the workstation, or the time of access of the workstation;

determines an authorization method for authorizing the user, wherein the authorization method is determined from the determined security policy in accordance with the received indication of the type of communication link between the workstation and the security server, the geographic location of the workstation, or the time of access of the workstation; and registers user identification data provided by the user against stored user data in accordance with the determined authorization method to authorize the user, wherein different authorization methods for authorizing the user are determined upon receipt of different security data, and wherein the security data does not include identification information for a particular user.

23. The security server according to claim 22 wherein the input device receives biometric data of the user from a biometric authentication device and provides the biometric data to the processing device as the user identification data for registration in accordance with the determined authorization method.

* * * * *